United States Patent [19]
Kurtz

[11] 4,283,300
[45] Aug. 11, 1981

[54] METHOD AND COMPOSITION TO INHIBIT STAINING OF PORCELAIN SURFACES BY MANGANESE

[75] Inventor: James L. Kurtz, Sharonville, Ohio

[73] Assignee: The Procter & Gamble Company, Cincinnati, Ohio

[21] Appl. No.: 28,612

[22] Filed: Apr. 9, 1979

[51] Int. Cl.$^3$ .................. C11D 3/395; C11D 7/54
[52] U.S. Cl. .................. 252/95; 252/174.23; 252/180; 4/227; 4/228; 134/3; 134/13; 210/701
[58] Field of Search .................. 252/95, 174.23, 180; 4/227, 228; 134/13, 3; 210/58

[56] References Cited

U.S. PATENT DOCUMENTS

| | | | |
|---|---|---|---|
| 3,462,365 | 8/1969 | Vogelsang, Jr. | 210/58 |
| 3,941,562 | 3/1976 | Hollingshad | 252/180 |
| 4,087,360 | 5/1978 | Faust et al. | 252/95 N |
| 4,175,100 | 11/1979 | Schiller | 525/327 |
| 4,229,410 | 10/1980 | Kosti | 4/224 |

OTHER PUBLICATIONS

Kirk-Othmer, Encyclopedia of Chemical Technology, 2nd Ed., vol. 22, 1970, p. 72.
E. I. du Pont de Nemours & Co., Electrochemicals Department Bulletin, "OXONE® Monopersulfate Compound", 1960, p. 3, col. 2, paragraph bridging pp. 3 & 4.

Primary Examiner—Mayer Weinblatt
Attorney, Agent, or Firm—Leonard Williamson; Ronald L. Hemingway; Richard C. Witte

[57] ABSTRACT

Method and composition to inhibit the staining of water-contacting surfaces, such as those in a toilet bowl, which is caused by manganese present in household water in the presence of an oxidizing material. Manganese staining is inhibited by supplying to the water 0.1 to 10 ppm of a partially hydrolyzed polyacrylamide material. Compositions are also described in the context of an automatic toilet tank dispenser which provides sufficient quantities of the above material in solution to inhibit manganese staining of toilet bowl surfaces.

7 Claims, No Drawings

METHOD AND COMPOSITION TO INHIBIT STAINING OF PORCELAIN SURFACES BY MANGANESE

TECHNICAL FIELD

The technical field to which this subject matter is most pertinent is that of dispensing materials to a toilet tank in order to clean and disinfect a flushing toilet. The invention also has broader application to other situations in which public water supplies containing manganese are brought into contact repeatedly with the porcelain surfaces of water storage and receiving elements.

INTRODUCTION

The problem which the teachings of the present invention are intended to solve is that of the staining of the surfaces of porcelain water-receiving articles, such as toilet bowls, by an oxidized form of manganese which may be produced when manganese-containing public water supplies are brought into contact with oxidizing materials in the presence of the porcelain articles.

The magnitude of this problem is indicated by reference to a study produced by the United States Environmental Protection Agency, wherein water samples were taken in communities throughout the country and analyzed for manganese content. This study is summarized in the publication entitled *Chemical Analysis of Interstate Carrier Water Supply Systems*, available from the U.S. Environmental Protection Agency (publication number EPA 430/9-75-005). That study indicates that about 8% of the population of the United States uses water from supplies which contain at least 50 parts per billion (ppb) of manganese. This manganese ordinarily remains in the water in the form of soluble salts of divalent manganese (divalent manganese is hereinafter referred to as "Mn(II)." More generally, a Roman numeral associated with an ionic species shall be used herein to denote the ion's valence.) But in the presence of oxidizing materials (such as hypochlorite ion) this Mn(II) can be oxidized to the tetravalent manganese ion, Mn(IV), forming an insoluble material (typically manganese dioxide, $MnO_2$) which can severely discolor a toilet bowl or other porcelain surface. Noticeable staining is observed at manganese levels of roughly 50 ppb if 5 ppm (parts per million) of hypochlorite are also present in the water. The severity of staining increases as the manganese and hypochlorite concentrations increase. (The concentration of manganese found in water supplies in high manganese areas of the United States is on the order of 250 ppb.)

Other inventors have produced improvements in automatic toilet tank dispensers which, among other things, automatically ration disinfecting ingredients to a toilet tank as it is flushed in order to maintain clean and sanitary conditions in the toilet tank and bowl. Solutions which deliver available chlorine in the form of hypochlorites have been found to be particularly useful to disinfect the toilet bowl. However, since hypochlorites are strong oxidizing materials (a property which contributes greatly to their utility as disinfectants), these hypochlorite solutions when introduced into the toilet bowl are able to oxidize the solubilized and surface-adsorbed Mn(II) ions to form insoluble Mn(IV) oxides. Under certain conditions, particularly those illustrated in connection with the present invention, these insoluble manganese (IV) salts can adhere to porcelain surfaces on the bowl to form dark brown manganese stains.

The chemistry of the manganese staining reaction is important to a complete understanding of the present invention, and accordingly, what follows is the theory which appears to underlie the present invention. (It will be understood, however, that the validity of the invention does not depend on the accuracy of the theory.) Three factors appear to contribute to the peculiar nature of manganese staining.

First, the reaction kinetics of the oxidation of Mn(II) to Mn(IV) are an important factor in manganese staining. The oxidation of manganese occurs at a sufficiently slow rate that substantial quantities of aqueous manganese ion can reach the porcelain surfaces of the toilet bowl and be absorbed thereon before oxidation to the insoluble Mn(IV) oxide occurs. As a result, the manganese achieves its position on the toilet bowl surfaces while soluble, and then oxidizes to a form which is difficult to remove. On the other hand, the manganese oxidation reaction is sufficiently rapid to allow it to go forward at an appreciable rate to cause a stain in the first instance.

The second factor which appears to make staining due to manganese a special problem is the autocatalytic nature of the manganese oxidation reaction. That is, the manganese oxidation reaction is catalyzed by the presence of Mn(IV) compounds, particularly manganese dioxide. This means that, although it may take a long time for a noticeable stain to appear, the eventual oxidation of only a very small portion of the available manganese will catalyze the reaction, which then proceeds rapidly to completion to produce a heavily stained surface.

Third, once the manganese stain is formed, it is extremely tenacious and difficult to remove with ordinary cleaning materials. The chemical nature of this problem is that certain tetravalent manganese compounds, particularly manganese dioxide and Mn(IV) hydroxide, are insoluble in water and are stable with respect to oxidizing materials which are found in conventional cleaning compositions. Also, the colored manganese compounds which form the stain are adsorbed into the porcelain surfaces of the toilet bowl. The stain is thus resistant to removal using scouring cleansers, for the abrasive particles of cleansers which are suitable for use on porcelain surfaces do not sufficiently abrade the toilet bowl to remove the adsorbed stains.

The factors—autocatalysis, kinetics, and tenacity—which make the manganese stain a special problem are not necessarily applicable to stains caused by the oxidation of other metallic species. For example, consider the staining which may occur due to the oxidation of iron from a soluble Fe(II) salt to Fe(III) oxide. This stain, while objectionable, is not particularly tenacious and may be removed using scouring cleansers. The kinetics of this oxidation reaction are such that the oxidation is very rapid in a solution which contains 5 ppm of available chlorine, as taught herein to be useful for disinfecting purposes. This reaction, as opposed to the manganese oxidation, is fast enough that nearly all of the Fe(II) in solution is oxidized, and precipitates or forms a suspension, before it has time to be tightly adsorbed into the porcelain surfaces of the toilet bowl. Thus, the Fe(III) forms a sedimentary deposit or a suspension which is largely removed by flushing, and which may be more completely removed by brushing or scrubbing the remaining stain. Finally, the Fe(III) stain is not autocatalyzed, so the rate of staining does not escalate after a stain first appears.

BACKGROUND ART

The prior art contains a number of references in various contexts which relate to the present invention.

Previous attempts to solve the problem of manganese staining may be found in U.S. Pat. Nos. 4,129,423 and 3,303,104.

The preparation of the polymeric materials which are used in the present invention to control manganese staining is within the scope of the prior art. See, for example, U.S. Pat. Nos. 2,886,558 and 3,022,279 (partially hydrolyzed polyacrylamides); and U.S. Pat. No. 3,933,673 (related materials). These compounds have been used for other purposes, such as the following: partially hydrolyzed acrylamides as flocculating agents (U.S. Pat. Nos. 3,784,597, 3,864,323); and several similar materials as chelating agents (U.S. Pat. No. 4,085,060).

The prior art also teaches the incorporation of chelating agents in surfactant containing compositions. An example of these references is U.S. Pat. No. 3,933,673. Built surfactants also may fall into this category. The typical uses of such built compositions, particularly in the context of tableted compositions, are within the purview of the detergent bar art.

Chelating materials have also been used for some analogous uses, for example, as scale inhibitors, as toilet bowl cleaners, and as stabilizers which prevent decomposition of peroxide bleaches in the presence of metal ions. It should be noted, however, that most of those prior uses of chelating agents have involved chelating materials which are not adapted to the present situation, in which materials are required to inhibit manganese staining in an environment which contains oxidizing material, in particular hypochlorite. For example, EDTA (ethylenediaminetetraacetic acid) and its several salts are widely known as chelating agents, but are not desirable for use in the present invention because they are not stable with respect to hypochlorite solutions. Other nitrogen-containing chelating agents, such as nitrilotriacetic acid (NTA), have problems similar to that of EDTA. Still other chelating agents, while able to chelate manganese, do not preferentially chelate manganese so as to be effective in the presence of the much higher concentrations of calcium and magnesium ions typically found in many local water supplies. (A typical water supply may have 6 to 7 grains of hardness per gallon, or 110 ppm of calcium carbonate.) Also, much of the art does not teach that one must inhibit manganese staining before a stain occurs, since once the manganese stain forms it is very difficult to remove. Finally, many chelating agents, although able to chelate manganese, are less desirable for use in compositions which will be introduced into waste water, since they contain the polyphosphate ions which have been implicated in the eutrophication of inland watercourses. In some areas use of such materials is restricted by law. As a result, there is a need for a new material which is able to prevent manganese staining while avoiding the problems associated with polyphosphate chelating or building agents.

SUMMARY OF THE INVENTION

The present invention is a method for inhibiting the staining of surfaces contacting water which contains manganese (II) ion and an oxidizing material capable of oxidizing Mn(II) to Mn(IV), comprising the step of maintaining in the water from 0.1 to 10 parts per million (ppm), preferably from 1 to 5 ppm, and most preferably from 3 to 4 ppm of certain partially hydrolyzed polyacrylamides as further defined hereinafter.

DESCRIPTION OF THE PREFERRED EMBODIMENTS

The following description of preferred embodiments of the present invention is provided in order to illustrate the practice of the invention, rather than to define its scope. The scope of the invention is defined by the claims appended to this specification.

In describing the present invention, the term "water-soluble" used in relation to a composition or compound shall mean that a saturated aqueous solution of that composition or compound provides at least the minimum concentration of the composition or compound which is effective for its intended purpose. For example, if a partially hydrolyzed polyacrylamide material is effective at a level of at least 0.1 ppm to inhibit manganese staining, it must be soluble in water to the extent of at least 0.1 ppm in order to be considered "water-soluble" herein.

Since the present invention finds primary utility in the cleaning and disinfecting of toilets, it will be described primarily in the context of that utility, although it will be understood that the invention is applicable to other situations where aqueous oxidizing solutions come into contact with surfaces which can be stained by oxidized manganese.

The present method invention is carried out by supplying 0.1 to 10 ppm, preferably 1 to 5 ppm, and most preferably about 3 to 4 ppm to the water which comes into contact with porcelain surfaces (e.g., a toilet bowl) of certain partially hydrolyzed polyacrylamides. A further description of those materials follows.

The partially hydrolyzed polyacrylamides which are useful for practicing the present invention are polyacrylamides in which a portion of the amide groups depending from the polymer backbone have been hydrolyzed to form carboxylate or carboxylic acid moieties. The partially hydrolyzed polyacrylamides within the scope of the present invention have average molecular weights between about 2000 atomic mass units (amu) and 10,000 amu, more specifically between 2000 amu and less than 5000 amu. The degree of hydrolysis in the partially hydrolyzed polyacrylamides should be at least enough to produce water-soluble material, and most preferably is at least about 80%. (Percent of hydrolysis refers to the numerical fraction of the amide groups which have been hydrolyzed to carboxylate or carboxylic acid moieties, multiplied by 100. For the present purposes, "partially hydrolyzed" shall be understood to exclude polyacrylic acid, which might be defined as a completely hydrolyzed polyacrylamide.) Commercially available partially hydrolyzed polyacrylamides useful herein include a polymer denoted as P-70, a polyacrylamide which is 80% hydrolyzed and which has a molecular weight of about 2000 amu. A second material which is a hydrolyzed polyacrylamide within the scope of the present invention is known as P-35, and is an 80% hydrolyzed polyacrylamide material with a molecular weight of about 7000 amu. P-70 and P-35 are commercially available from the American Cyanamid Company, Wayne, New Jersey 07470.

The polymeric materials taught for use herein have a multiplicity of carboxylic acid moieties, each of which may be present either as a free acid moiety or as the anionic portion of an alkali metal salt. The degree to which the free acid moieties are neutralized is not important to the present invention, and accordingly, may range from approximately 0% to 100%.

The following theory is proposed to explain the manganese stain inhibiting action of the materials described above, although this theory is not intended to limit the scope of the present invention. The materials described above are water-soluble polymers with multiple carboxylate or carboxylic acid moieties depending from the polymer backbone. These depending moieties give the indicated polymers the properties of a chelating agent, allowing them to sequester metal ions such as manganese. The three essential results of this chelating action are, first, that Mn(II) and (IV) are kept away from porcelain surfaces while these species are in the bowl (because the chelating agents combine with these ionic species to form soluble materials, suspensions, or loose precipitates) and, second, that chelating agents mainain these ionic species in a form, such as a solution or a flushable precipitate, that is washed away once the toilet is flushed, and, third, that Mn(II) ions are sequestered in a way that retards their oxidation to Mn(IV).

One feature that has been found to distinguish the manganese stain inhibiting materials of the present invention from other materials is the ability of the present materials to prevent manganese staining in the presence of a great excess of calcium and magnesium ions as are found in hard water. This phenomenon is not predicted by the present materials' binding constants for magnesium or calcium. Thus, even though typical hard water has many times more hardness ions than the highest known manganese concentration in a water supply (100 ppm vs. 350 ppb), the materials taught herein for stain inhibition have been found to be surprisingly effective to inhibit manganese staining without being required in sufficient quantities to chelate all ions which are present in the water. While this phenomenon is not fully understood, the reason is seen to be that these polymeric materials sequester manganese preferentially due to operation of some mechanism in addition to ordinary chelation.

To practice the present method invention, any of the above materials, either singly or in combinations, are dispensed into the water of a toilet tank or bowl so that after flushing the toilet bowl contains the indicated concentrations of an evenly dispersed polymer. One way to accomplish this is to place liquid solutions of the indicated materials in a liquid dispenser of the type which dispenses a constant volume of a liquid to the toilet tank every time the toilet is flushed. Water from the tank then is supplied to the toilet bowl in the typical fashion, so that the water introduced into the toilet bowl has the indicated proportions of the selected materials. A preferred dispenser may deliver a dose of 1-2 milliliters of solution to a toilet tank every time it is flushed, so that in order to deliver the desired proportions of the stain reducing material to the toilet bowl and tanks, a solution containing 1% to 6% by weight of the indicated material is placed in the dispenser and dispensed into a toilet with a dilution factor of approximately 10,000 times. It will be apparent to those skilled in the art that many different toilet dilution factors and stain inhibiting solution concentrations can be used to practice the present invention, provided the final concentration of the material supplied to prevent manganese staining in the toilet bowl water is within the indicated ranges.

In a particularly preferred embodiment of the present invention, the stain inhibiting composition is adapted to be dispensed from a passive dosing dispenser as described in a U.S. patent application, Ser. No. 897,479, filed by Dwight Wages on Apr. 18, 1978. This application refers to the following patent applications: U.S. Ser. No. 897,469, filed Apr. 18, 1978, by Robert Dirksing; and U.S. Ser. No. 897,477, filed Apr. 18, 1978, by Robert Dirksing. These applications are hereby incorporated herein by reference; they are owned by the owners of the present application. Such dispensers are particularly preferred because they may contain a cake or cakes of solid ingredients which are exposed to water to form a cleaning, disinfecting, or aesthetic (hereinafter: cleaning) solution which is kept in isolation from the water of the toilet tank until the toilet is flushed. At this time, the preferred dispensers provide a measured quantity of the cleaning solution to the toilet flush water in order to produce a fairly constant level of the cleaning ingredients within the water of the toilet bowl at all times. In this context, the quantity of manganese stain inhibiting agent which is released to the toilet is adjusted so that the concentration of the stain inhibiting agent in the toilet bowl is at the levels specified in the present description.

Particular compositions of cleaning ingredients may be specified for use in a toilet tank dispenser which will produce concentrations of the manganese stain inhibiting agent which approximate those required in order to practice the present invention without incorporating an undue excess of the stain inhibiting material in the cake of active ingredients. For example, a cake of cleaning and stain inhibiting ingredients within a dispenser, known hereinafter as a "surfactant cake," may be formulated with from about 50% to about 90% of a surfactant and from about 5% to about 30% of one of the stain inhibiting agents described above. Other ingredients which may be included in the composition of the surfactant cake within the scope of the present invention are as follows: 0% to 6% of a suitable dye; 0% to 15% of a perfume with a desirable fragrance; 0% to 15% of a material which reduces the solubility of the surfactant; and 0% to 20% of a suitable bleach catalyst, diluent material, or processing aid.

In the ordinary practice of the invention an oxidizing agent (e.g., a hypochlorite solution) is supplied to the toilet water from a dispensing means separate from that which dispenses the ingredients of the above-described cake. This is done to prevent prolonged contact between high concentrations of the oxidizing agent and the other ingredients prior to their dispensation to the toilet. The invention is not limited to situations in which an oxidizing material is separately dispensed to the toilet, however, nor is it limited to an embodiment in which the oxidizing material is intentionally supplied to the toilet. In certain instances the oxidizing material may be codispensed with other ingredients, or may even be present in the water as supplied to the toilet from a public or private water supply, for example, water which has been chlorinated.

What follows is a description of each of the ingredients of surfactant cakes made according to preferred embodiments of the present invention.

Surfactants

One essential ingredient of surfactant cakes of the present invention is a suitable surfactant. The surfactants may be most broadly defined as enumerated surfactants selected from anionic, nonionic, ampholytic, zwitterionic, and cationic surfactants.

Anionic surfactants operable in compositions suitable for use in the present invention can be broadly described as the water-soluble salts, particularly the alkali metal salts, of organic sulfuric acid reaction products having in their molecular structure an alkyl or alkaryl radical containing from about 8 to about 22 carbon atoms and a radical selected from the group consisting of sulfonic acid and sulfuric acid ester radicals. (Included in the term alkyl is the alkyl portion of higher acyl radicals.) Important examples of the anionic surfactants which can be employed in the practicing of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, (the alkyl radical can be a straight or branched aliphatic chain); paraffin sulfonate surfactants having the general formula $RSO_3M$, wherein R is a primary or secondary alkyl group containing from about 8 to about 22 carbon atoms (preferably 10 to 18 carbon atoms) and M is an alkali metal, e.g., sodium or potassium; sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g., tallow or coconut oil alcohols) and about 1 to 10 moles of ethylene oxide; sodium or potassium salts of alkyl phenol ethylene oxide ether sulfates with about 1 to about 10 units of ethylene oxide per molecule and in which the alkyl radicals contain from about 8 to about 12 carbon atoms; the reaction products of fatty acids esterified with isethionic acid and neutralized with sodium hydroxide where, for example, the fatty acids are derived from coconut oil; sodium or potassium salts of fatty acid amides of a methyl tauride in which the fatty acids, for example, are derived from coconut oil and sodium or potassium $\beta$-acetoxy- or $\beta$-acetamido-alkanesulfonates where the alkane has from 8 to 22 carbon atoms.

Nonionic surfactants which can be used in practicing the present invention can be of three basic types—the alkylene oxide condensates, the amides and the semipolar nonionics.

The alkylene oxide condensates are broadly defined as compounds produced by the condensation of alkylene oxide groups (hydrophilic in nature) with an organic hydrophobic compound, which can be aliphatic or alkyl aromatic in nature. The length of the hydrophilic or polyoxyalkylene radical which is condensed with any particular hydrophobic group can be readily adjusted to yield a water-soluble-compound having the desired degree of balance between hydrophilic and hydrophobic elements.

Examples of such alkylene oxide condensates include:

1. The condensation products of aliphatic alcohols with ethylene oxide. The alkyl chain of the aliphatic alcohol can either be straight or branched and generally contains from about 8 to about 22 carbon atoms. Examples of such ethoxylated alcohols include the condensation product of about 6 moles of ethylene oxide with 1 mole of tridecanol, myristyl alcohol condensed with about 10 moles of ethylene oxide per mole of myristyl alcohol, the condensation product of ethylene oxide with coconut fatty alcohol wherein the coconut alcohol is a mixture of fatty alcohols with alkyl chains varying from 10 to 14 carbon atoms and wherein the condensate contains about 6 moles of ethylene oxide per mole of alcohol, and the condensation product of about 9 moles of ethylene oxide with the above-described coconut alcohol. Examples of commercially available nonionic surfactants of this type include Tergitol 15-S-9 marketed by the Union Carbide Corporation, Neodol 23-6.5 marketed by the Shell Chemical Company and Kyro EOB marketed by The Procter & Gamble Company. 2. The polyethylene oxide condensates of alkyl phenols. These compounds include the condensation products of alkyl phenols having an alkyl group containing from about 6 to about 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds can be derived, for example, from polymerized propylene, diisobutylene, octene, or nonene. Examples of compounds of this type include nonyl phenol condensed with about 9.5 moles of ethylene oxide per mole of nonyl phenol, dodecyl phenol condensed with about 12 moles of ethylene oxide per mole of phenol, dinonyl phenol condensed with about 15 moles of ethylene oxide per mole of phenol, di-isooctylphenol condensed with about 15 moles of ethylene oxide per mole of phenol. Commercially available nonionic surfactants of this type include Igepal CO-610 marketed by the GAF Corporation; and Tritol X-45, X-114, X-100 and X-102, all marketed by the Rohm and Haas Company. 3. The condensation products of ethylene oxide with a hydrophobic base formed by the condensation of propylene oxide with propylene glycol. The hydrophobic portion of these compounds has a molecular weight of from about 1500 to 1800 and of course exhibits water insolubility. The addition of polyoxyethylene moieties of the hydrophobic portion tends to increase the water-solubility of the molecule. Examples of compounds of this type include certain of the commercially available Pluronic surfactants marketed by the Wyandotte Chemicals Corporation. 4. The condensation products of ethylene oxide with the product resulting from the reaction of propylene oxide and ethylene diamine. The hydrophobic base of these products consists of the reaction product of ethylene diamine and excess propylene oxide, said base having a molecular weight of from about 2500 to about 3000. This base is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic compounds marketed by the Wyandotte Chemicals Corporation.

Examples of the amide type of nonionic surfactants include the ammonia, monoethanol and diethanol amides of fatty acids having an acyl moiety of from about 8 to about 18 carbon atoms. These acyl moieties are normally derived from naturally occurring glycerides, e.g., coconut oil, palm oil, soybean oil and tallow, but can be derived synthetically, e.g., by the oxidation of petroleum, or by hydrogenation of carbon monoxide by the Fischer-Tropsch process.

Examples of the semi-polar type of nonionic surfactant are the amine oxides, phosphine oxides and sulfoxides. These materials are described more fully in U.S.

Pat. No. 3,819,528, Berry, issued June 25, 1974, and incorporated herein by reference.

Ampholytic surfactants which can be used in practicing the present invention can be broadly described as derivatives of aliphatic amines which contain a long chain of about 8 to about 18 carbon atoms and an anionic water-solubilizing group, e.g., carboxy, sulfo and sulfato. Example of compounds falling within this definition are sodium-3-dodecylamino-propionate, sodium-3-dodecylamino propane sulfonate, and dodecyl dimethylammonium hexanoate.

Zwitterionic surfactants which can be used in practicing the present invention are broadly described as internally-neutralized derivatives of aliphatic quaternary ammonium and phosphonium and tertiary sufonium compounds, in which the aliphatic radical can be straight chain or branched, and wherein one of the aliphatic substituents contains from about 8 to about 18 carbon atoms and one contains an anionic water-solubilizing group, e.g., carboxy, sulfo, sulfato, phophato, or phosphono.

Cationic surfactants which can be used in practicing the present invention include stearyl dimethyl benzyl ammonium chloride, coconut dimethyl benzyl ammonium chloride, cetyl pyridinium chloride and cetyl trimethyl ammonium chloride Hypochlorite-stable surfactants which are especially resistant to oxidation are the alkyl sulfates and paraffin sulfonates. Alkyl sulfates are the water-soluble salts of sulfated fatty alcohols containing from about 8 to about 18 carbon atoms in the alkyl group. Examples of suitable alcohols which can be employed in alkyl sulfate manufacture include decyl, lauryl, myristyl, palmityl and stearyl alcohols and the mixtures of fatty alcohols derived by reducing the glycerides of tallow and coconut oil.

Specific examples of alkyl sulfate salts which can be employed in the instant surfactant/dye compositions include sodium lauryl alkyl sulfate, sodium stearyl alkyl sulfate, sodium palmityl alkyl sulfate, sodium decyl alkyl sulfate, sodium myristyl alkyl sulfate, potassium lauryl alkyl sulfate, potassium stearyl alkyl sulfate, potassium decyl sulfate, potassium palmityl alkyl sulfate, potassium myristyl alkyl sulfate, sodium dodecyl sulfate, potassium dodecyl sulfate, potassium tallow alkyl sulfate, sodium tallow alkyl sulfate, sodium coconut alkyl sulfate, potassium coconut alkyl sulfate and mixtures of these surfactants. Highly preferred alkyl sulfates are sodium coconut alkyl sulfate, potassium coconut alkyl sulfate, potassium lauryl alkyl sulfate and sodium lauryl alkyl sulfate.

Paraffin sulfonate surfactants have the general formula $RSO_3M$, wherein R is a primary or secondary alkyl group containing from about 8 to about 22 carbon atoms (preferably 10 to 18 carbon atoms) and M is an alkali metal, e.g., sodium or potassium. Paraffin sulfonate surfactants and methods for their preparation are well known in the art. They may be prepared, for example, by reaction of hydrocarbons with sulfur dioxide, oxygen and a sulfonation reaction initiator. Alternatively, they may be prepared by reacting an alkene and a sodium bisulfite under suitable radiation or catalysis, as disclosed in British Pat. No. 1,451,228 published September 29, 1976, and hereby incorporated herein by reference. Paraffin sulfonate surfactants are commercially available, e.g., from Farbwerke Hoechst A.G.

Preferred paraffin sulfonates herein are secondary paraffin sulfonates. Examples of specific paraffin sulfonates herein are:
Sodium-1-decane sulfonate;
Potassium-2-decane sulfonate;
Lithium-1-dodecane sulfonate;
Sodium-6-tridecane sulfonate;
Sodium-2-tetradecane sulfonate;
Sodium-1-hexadecane sulfonate;
Sodium-4-octadecane sulfonate;
Sodium-3-octadecane sulfonate.

Normally, the paraffin sulfonates are available as mixtures of individual chain lengths and position isomers, and such mixtures are suitable for use herein.

Stain Inhibiting Agent

The stain inhibiting agents for use herein have been described above, so no need is seen for a repetition of this description. Of the stain inhibiting agents, an 80% hydrolyzed polyacrylamide with an average molecular weight of 7000 amu may be selected for use herein as the best mode known to the inventor of practicing the invention.

It has unexpectedly been found that the incorporation of this particular manganese stain inhibiting agent as a component of a surfactant cake containing a sodium paraffin sulfonate surfactant and made in accordance with the present invention improves the surfactant cake by providing a temperature coefficient of solubility of nearly unity for the surfactant cake. (The temperature coefficient of solubility shall be defined herein as the ratio of the solubility of the surfactant cake in distilled water at 4 degrees Celsius to the solubility of the surfactant cake in distilled water at 27 degrees Celsius.) This property of a preferred surfactant cake is important because it allows the formation of a composition which will dissolve at the same rate whether cool (4° Celsius) or warm (27° Celsius) water is supplied to the toilet in question, and thus to the toilet tank dispenser contained therein. As a result, the dispenser will provide a constant delivery of surfactant cake ingredients in summer or winter, and in relatively warmer and cooler climates. Since these temperatures for cool and warm water are selected to approximate the temperature extremes to which toilets in the United States are typically subjected, it will be apparent that a single surfactant cake may be formulated for use nearly anywhere in the United States if these 80% hydrolyzed polyacrylamide materials are incorporated therein in the proportions described in this specification. This best mode material has also been found to practically eliminate the difference in solubility of the surfactant cakes containing sodium paraffin sulfonate surfactants as a function of water hardness. (The hardness solubility coefficient is defined herein as the ratio of surfactant cake solubility in 20 grain hard water (342 ppm of calcium carbonate) to surfactant cake solubility in distilled water.)

The unexpected effects of certain manganese stain inhibiting materials on hardness and temperature solubility coefficients of surfactant cakes were not discovered by the present inventor.

Dyes

While it is appreciated that no dye is essential to the operation of the present invention, it is desirable to incorporate a dye in the surfactant cake in order to color the water of the toilet, both to indicate the presence or absence of cleaning ingredients and to improve the toilet aesthetically. Either of two types of dyes may be incorporated into compositions of the present invention in order to improve toilet bowl aesthetics or to signal the presence or absence of active ingredients in the water of the toilet bowl.

A first type of dye which may be used herein is a dye which is relatively stable to hypochlorite solutions, so that its color persists despite the presence in the toilet bowl of a concentration of hypochlorite which is effective to maintain sanitary conditions. Such dyes are described in a commonly owned U.S. patent application, Ser. No. 972,318, filed by Kitko on Dec. 22, 1978, which is hereby incorporated herein by reference.

A second type of dye which may be incorporated in a surfactant cake for use herein is one which initially dyes the toilet bowl water, but which is bleached to a colorless state responsive to the presence of a sanitizing concentration of hypochlorite. Such a system allows the consumer to evaluate whether a dispenser which is intended to dispense hypochlorite and surfactant ingredients from separate sources is in fact dispensing both ingredients. In this dye system a color which initially appears is indicative of the dispensing of surfactants, since the surfactant and dye are part of the same cake of ingredients. The gradual disappearance of this color indicates that hypochlorite is being dispensed to the bowl at a concentration which is effective to bleach the dye. Such a dye system is described in a commonly owned U.S. patent application, Ser. No. 915,027, filed by Kitko on June 12, 1978, which is hereby incorporated herein by reference.

Perfumes

Perfumes selected for use in the compositions of the present invention should be stable to hypochlorite in the environment of preferred use, and should be sufficiently potent that the indicated percentage by weight of perfume will supply to the water of the toilet an aesthetically desirable concentration of perfume in the head space immediately adjacent the water of the toilet tank and bowl.

Surfactant Solubility Control Agent

It is highly desirable to incorporate in the compositions of the present invention an agent which will regulate the dissolution of the surfactant in order to optimize the life of the surfactant cake by preventing the dispensing of unnecessarily large or small amounts of surfactants to the toilet tank. One particularly useful ingredient with this property is isobornyl acetate. It is believed that other sterically riged molecules similar to isobornyl acetate may also be used to decrease the solubility of surfactants of the present invention, in particular to decrease the solubility of the sodium paraffin sulfonate surfactants which are preferred surfactants for use in the present invention. Also, it has been found that P-35 also reduces the solubility of preferred surfactant cakes, as further described in Example 14. The isobornyl acetate is used in a ratio of surfactant to isobornyl acetate of from about 4:1 to 50:1.

Processing Aids and Other Materials

Various materials may be incorporated in the surfactant cake of the present invention in order to dilute the dry ingredients to a consistency which may be easily worked in conventional blending equipment. Examples of such materials are sodium chloride and other materials of a similar nature. Desired materials of this type are inexpensive and water-soluble, and are stable with respect to all of the components of the surfactant cake.

Another particularly desirable material to add to the surfactant is sodium bromide. This material serves as a catalyst to improve the rate at which a hypochlorite solution separately dispensed to a toilet bowl will decolorize the bleachable dye system described above under low pH conditions.

Surfactant Cake Manufacture

The manufacture of solid cakes from the compositions of the present invention is well within the capability of persons of ordinary skill in the art of forming bars of toilet soap. The surfactant cakes of the present invention as described herein were manufactured by mixing the raw materials into a homogenous mass and noodling, plodding, extruding, cutting and stamping the mass to form uniform bars or cakes sized to fit within the preferred dispensers described as preferred surfactant dispensers in the patent application of Wages, Ser. No. 897,479, which is incorporated by referance above.

Disinfecting Solutions

As is mentioned above, the presence of strong oxidizing materials in the toilet bowl is one of the causes of the manganese staining which is reduced or eliminated by the present invention. Absent the problem of manganese staining, the addition of hypochlorite ions to toilet water is highly desirable because hypochlorite is an efficacious disinfecting agent. Hypochlorite ions may be supplied to the toilet bowl by any of a wide variety of compounds. Specifica examples of compounds of this type include sodium hypochlorite, potassium hypochlorite, lithium hypochlorite, calcium hypochlorite, calcium hypochlorite dihydrate, mono-basic calcium hypochlorite, dibasic magnesium hypochlorite, chlorinated trisodium phosphate dodecahydrate, potassium dichloroisocyanurate, sodium dichloroisocyanurate, sodium dichloroisocyanurate dihydrate, 1,3-dichloro-5,5-dimethyl-hydantoin, N-chlorosulfamide, chloramine T, dichloroamine T, chloromaine B, and dichloramine B. Preferred sanitizing agents are calcium hypochlorite, lithium hypochlorite, and mixtures thereof. A particularly preferred sanitizing agent suitable for use in the practice of the present invention is described in the commonly assigned U.S. patent application filed by Nyquist et al., entitled PASSIVE DOSING DISPENSER WITH IMPROVED HYPOCHLORITE CAKE, Ser. No. 019,547, filed Mar. 12, 1979, said patent application being incorporated herein by reference. As indicated in the Nyquist application, the sanitizing material is compounded into a separate cake which is contacted with toilet tank water in an entirely separate dispenser. The dispenser for the surfactant cake and for the hypochlorite cake are desirably molded into a single integral unit, as by thermoforming shells and assembling them as indicated in the Nyquist application. Means are thus provided to dispense roughly 5 to 10 ppm of hypochlorite to the water of a toilet while concurrently dispensing the indicated proportions of a manganese stain inhibiting agent to the toilet tank water in order to prevent the oxidizing action of the hypochlorite from forming the insoluble Mn(IV) compounds which are responsible for manganese staining.

EXAMPLES

The following example was conducted in order to demonstrate the ability of compositions of the present invention to reduce manganese staining in the environment of a toilet bowl under conditions simulating a situation where a high content of manganese is supplied to the water feeding the toilet.

In each experiment, the tanks of conventional home toilets were supplied with a sufficient quantity of water solution of manganese (II) chloride tetrahydrate to provide a concentration of Mn(II) of 1.0 to 1.4 ppm in the toilet bowl. This was accomplished by dispensing 1-2 milliliters of a 14,000 ppm solution of Mn(II) from an automatic dispenser. It was found by experiment that during the downflush of the toilet this solution was diluted 10,000 to 15,000 times, thus supplying the indicated quantity of Mn(II) to the toilet bowl. Each of the toilets was supplied with 1-2 milliliters per flush of a 5% solution of sodium hypochlorite in identical fashion, resulting in an available chlorine delivered to the toilet bowl of 5 to 10 ppm. This hypochlorrite solution also contained a sufficient quantity of Dowfax 3B2 surfactant (purchased from Dow Chemical Company, Midland, Michigan) to allow the particular type of automatic hyopchlorite dispenser used in this experiment to function properly. (Use of this particular surfactant is not critical to the operation of the present invention.)

For each experiment, an experimental toilet and a control toilet were supplied with hypochlorite and manganese ions (as noted above). These concentrations of these species have been found to promote heavy staining since they are somewhat above the levels of these ions which would normally be present in a toilet tank when practicing the present invention.

Several compositions were made up in order to test the present invention. They are as follows: (A) A water solution of 2% P-35 (as further identified above) and 1% of a sodium paraffin sulfonate surfactant. This composition was delivered to the experimental toilet throgh an automatic liquid dispenser feeding into the toilet tank. (B) A solid surfactant cake containing 20% P-35; 64.3% of a sodium paraffin sulfonate surfactant; 8.5% of a perfume; 4.3% of a dye; and 2.9% sodium bromide. This composition was delivered by a passive dosing toilet tank dispenser of the type described in the Wages application, U.S. Ser. No. 897,479, incorporated by reference above. (C) A water solution of 3% P-70 (as described previously) and 1% sodium alkyl benzene sulfonate. This composition was also delivered from automatic liquid dispensers as described above.

Table 1 summarizes the conditions for a number of experiments wherein compositions (A), (B) and (C) noted above were evaluated for their ability to prevent the generation of manganese stains, as opposed to control toilets which received the stain-causing materials but not the materials adapted to prevent stains. The temperatures and concentrations indicated in Table 1 are those of the bowl water and of the stain reducing ingredient in the respective compositions. (The sodium paraffin sulfonate surfactant, perfume, dye, and sodium bromide are not considered to be important to the creation or inhibition of manganese staining, so they were not incorporated in the compositions tested in the examples.)

TABLE 1

| Example | Test Comp. | Temp. | Conc. | Flushes |
|---|---|---|---|---|
| 1 | A* | 16° C. | 2 ppm | 75 |
| 2 | A* | 4° C. | 2 ppm | 75 |
| 3 | B** | 6° C. | 4 ppm | 22 |
| 4 | B** | 6° C. | 4 ppm | 50 |
| 5 | B** | 6° C. | 4 ppm | 76 |
| 6 | C* | 20° C. (est.) | 3 ppm | 71 |

*Dispensed from automatic liquid dipensers.
**Dispensed from cake dispensers described as preferred surfactant dispensers in Wages, U.S. Ser. No. 897,479.

The results of the tests of Table 1 are as follows:

EXAMPLE 1

The experimental toilet has a light brown, streaky stain; the control toilet had an intense dark brown stain below the water line.

EXAMPLE 2

The experimental toilet had no stain, while the control toilet exhibited a light brown stain.

EXAMPLE 3

The experimental toilet had no stain, while the control toilet had a light brown stain.

EXAMPLE 4

The experimental toilet had a light brown stain at the bottom of the bowl only and the control toilet had a dark brown stain.

EXAMPLE 5

The experimental toilet had a light brown stain, while the control toilet had an intense dark brown stain.

EXAMPLE 6

The experimental toilet had a slight brown stain, while the control toilet had a severe brown stain.

EXAMPLE 7

To illustrate that the present invention works in the field, two matched toilets (paired toilets consisting of a test toilet and a control toilet, each of the same type and located in the same test home) were located in Fairfield, Ohio, a community with a water supply which supplies about 200 ppb of manganese. Each toilet was supplied with about 5 to 10 ppm of available chlorine by the hypochlorite dispenser of the type described in the Nyquist application, (U.S. Ser. No. 019,547) incorporated by reference above. A surfactant cake having the composition of Composition B as described previously (containing P-35) was incorporated in the surfactant cake dispensing portion of a passive toilet tank dispenser described as a preferred surfactant dispenser in the patent application of Wages, incorporated by reference above. A second surfactant cake was formulated with the same ingredients and proportions found in Composition B, except that the P-35 was replaced with an additional quantity of the sodium paraffin sulfonate surfactant of Composition B. This second composition was incorporated in an identical dispenser. (Thus, the comparison was between a surfactant cake with P-35 and one without P-35 in an environment where hypochlorite was separately provided to the boilet bowl. The respective dispensers were placed in the Fairfield test and control toilets, which were then used normally by the occupants of the test home. (Before placement the toilet bowls were cleaned and examined to ensure equal starting conditions in the test and control toilets.)

After 8 days the test home was revisited and the test and control toilets were examined and compared. The test toilet bowl was found to have only a light ring about the water line, while the control toilet bowl was completely stained below the water line.

I claim:

1. A method of inhibiting the staining of surfaces in contact with water which contains at least about 50 ppb of manganese II ions and an oxidizing agent which would oxidize said manganese (II) ions to form staining manganese (IV) ions; said method comprising the step of independently dispensing into said water which contains said manganese (II) ions and said oxidizing agent, from about 0.1 ppm to about 10 ppm of water-soluble, partially hydrolyzed polyacrylamide material having an average molecular weight of from 2000 to 10,000 atomic mass units, and wherein the polyacrylamide contains amide groups which were hydrolyzed to carboxylate/carboxylic acid moieties.

2. The method of claim 1 wherein said oxidizing agent is further identified as a source of hypochlorite ions.

3. The method of claim 1 wherein said water-soluble, partially hydrolyzed polyacrylamide material has an average molecular weight of about 2000 atom mass units.

4. The method of claim 2 wherein 1 ppm to 5 ppm of said water-soluble, partially hydrolyzed polyacrylamide material are dispensed into said water.

5. The method of claim 4 wherein said water-soluble, partially hydrolyzed polyacrylamide material is approximately 80% hydrolyzed.

6. The method of claim 5 wherein about 3 ppm to about 4 ppm of said water-soluble, partially hydrolyzed polyacrylamide material are dispensed into said water.

7. The method of claim 2 wherein said oxidizing agent is independently and concurrently dispensed into said water from a separate source.

* * * * *